(12) United States Patent
Brown

(10) Patent No.: US 11,148,591 B2
(45) Date of Patent: Oct. 19, 2021

(54) APPARATUS AND METHOD FOR INTERIOR AMBIENT MOOD LIGHTING IN A VEHICLE

(71) Applicant: Ryan Brown, Wylie, TX (US)

(72) Inventor: Ryan Brown, Wylie, TX (US)

( * ) Notice: Subject to any disclaimer, the term of this patent is extended or adjusted under 35 U.S.C. 154(b) by 0 days.

(21) Appl. No.: 16/183,605

(22) Filed: Nov. 7, 2018

(65) Prior Publication Data

US 2019/0135174 A1    May 9, 2019

Related U.S. Application Data

(60) Provisional application No. 62/582,827, filed on Nov. 7, 2017.

(51) Int. Cl.
| | |
|---|---|
| *B60Q 3/88* | (2017.01) |
| *B60Q 3/74* | (2017.01) |
| *B60Q 3/70* | (2017.01) |
| *F21V 23/00* | (2015.01) |
| *H05B 45/20* | (2020.01) |
| *H05B 47/19* | (2020.01) |
| *B60R 16/02* | (2006.01) |
| *F21Y 115/10* | (2016.01) |

(52) U.S. Cl.
CPC .................. *B60Q 3/74* (2017.02); *B60Q 3/70* (2017.02); *B60Q 3/88* (2017.02); *F21V 23/001* (2013.01); *H05B 45/20* (2020.01); *H05B 47/19* (2020.01); *B60R 16/0207* (2013.01); *F21Y 2115/10* (2016.08)

(58) Field of Classification Search
CPC . B60Q 3/88; B60Q 3/70; H05B 33/08; H05B 33/0863; H60Q 3/70; F21V 23/001
USPC ......................................................... 362/543
See application file for complete search history.

(56) References Cited

U.S. PATENT DOCUMENTS

2013/0249394 A1* 9/2013 Fay ...................... B60Q 1/0088
315/77

* cited by examiner

*Primary Examiner* — Elmito Breval
(74) *Attorney, Agent, or Firm* — Leavitt Eldredge Law Firm

(57) ABSTRACT

An apparatus for interior ambient mood lighting, the apparatus includes a wire harness; one or more pin terminals integral with the wire harness and to engage with and obtain power from a vehicle electrical control unit; and one or more lighting devices electrically connected to the wire harness and to receive power from the one or more pin terminals via wire; the wire harness and the one or more pin terminals is vehicle specific, thereby being able to engage with a specific vehicle make and model.

8 Claims, 5 Drawing Sheets

APPARATUS AND METHOD FOR INTERIOR AMBIENT MOOD LIGHTING IN A VEHICLE

BACKGROUND

1. Field of the Invention

The present invention relates generally to lighting systems for vehicles, and more specifically, to an apparatus and method for providing ambient light within a vehicle.

2. Description of Related Art

Lighting systems are well known in the art and are effective means to provide interior light within a vehicle. For example, FIG. 1 depicts a conventional vehicle 101 having one or more lights 103 secured within an interior 105 of vehicle 101. During use, lights 103 are activated by the user to allow for improved visibility within the interior 105 of the vehicles.

One of the problems commonly associated with conventional lighting systems for vehicles, is the lack of ambient light to remain active during driving and continued use of the vehicles. Some ambient lighting systems are available for vehicles, however, these systems are expensive, difficult to install, and not available for all makes and models.

Accordingly, although great strides have been made in the area of lighting systems for vehicles, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
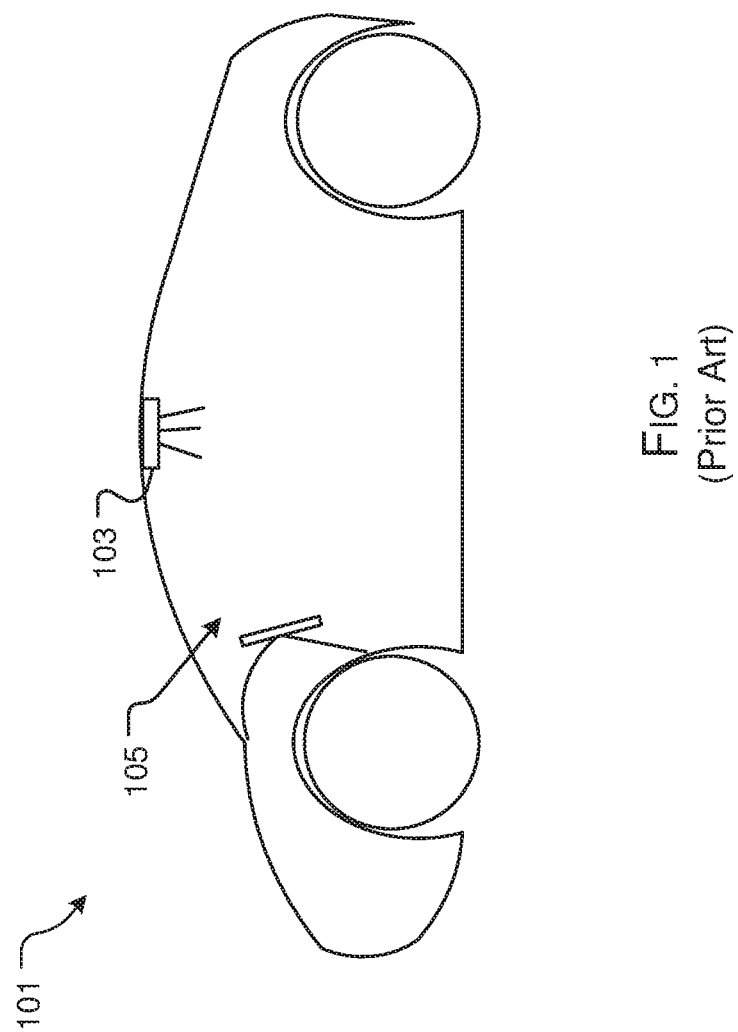
FIG. 1 is a simplified side view of a common vehicle lighting system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle lighting systems. Specifically, the present invention provides a means to easily and conveniently provide ambient lighting within a vehicle of any make and model. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
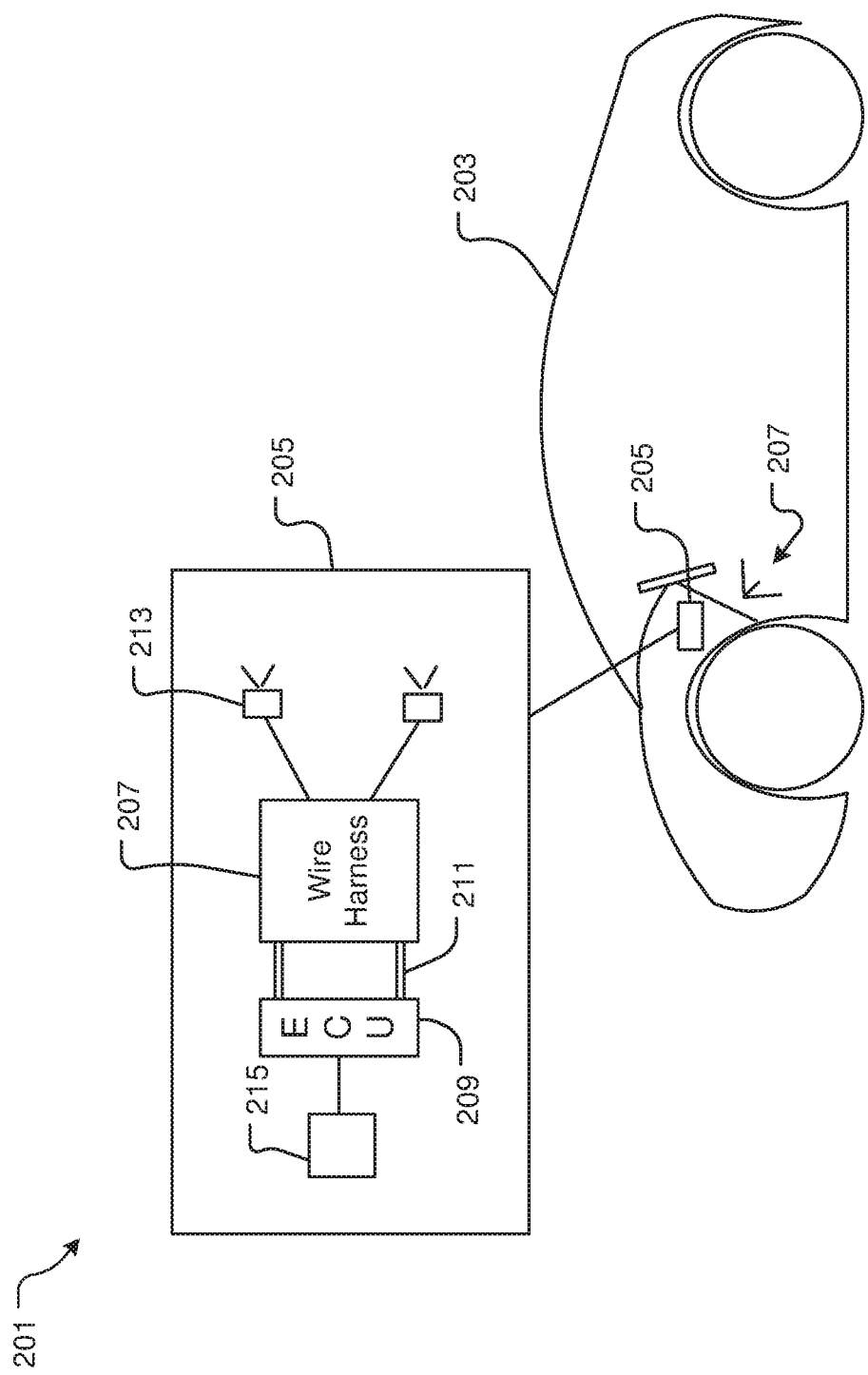
FIG. 2 is a simplified schematic of a vehicle lighting system in accordance with a preferred embodiment of the present application.

Referring now to the drawings wherein like reference characters identify corresponding or similar elements throughout the several views, FIG. 2 depicts a simplified schematic of a vehicle lighting system 201 in accordance with a preferred embodiment of the present application. It will be appreciated that system 201 overcomes one or more of the above-listed problems commonly associated with conventional vehicles lighting systems.

In the contemplated embodiment, system 201 includes a vehicle 203 of any make and model and an ambient lighting apparatus 205 configured to provide ambient light 207 within vehicle 203. It should be appreciated that apparatus 205 can be mounted at various locations within vehicle 203 such as the dashboard, a door handle, a door panel, a map pocket, and/or a cup holder.

As shown in the schematic of FIG. 2 associated with apparatus 205, the apparatus 205 includes a wire harness 207 specifically adapted for the particular make and model of vehicle 203. Wire harness 207 can vary in features, design, number of wires, and other features as is necessary to incorporate into vehicle 203. Harness 203 is coupled to the vehicle electrical control unit 209 via one or more wires and/or pin terminals 211. The pin terminals 211 are common in the art and can vary as necessary to connect to the ECU.

Apparatus 205 further includes one or more lighting device 213 connected to wire harness 207. It is contemplated that lighting device 213 can be soldered to harness 207 and a include additional necessary components such as wiring. Lighting devices 213 are configured to provide ambient light within the interior of the vehicle. It is contemplated that lighting devices 213 can vary in number, size, and color.

Apparatus 205 further includes a command system 215. In some embodiments, command system 215 is incorporated into electronic control unit 209, however, alternative embodiments contemplate additional electronic components configured to provide a means for the user to control apparatus 205.

Figure 3:
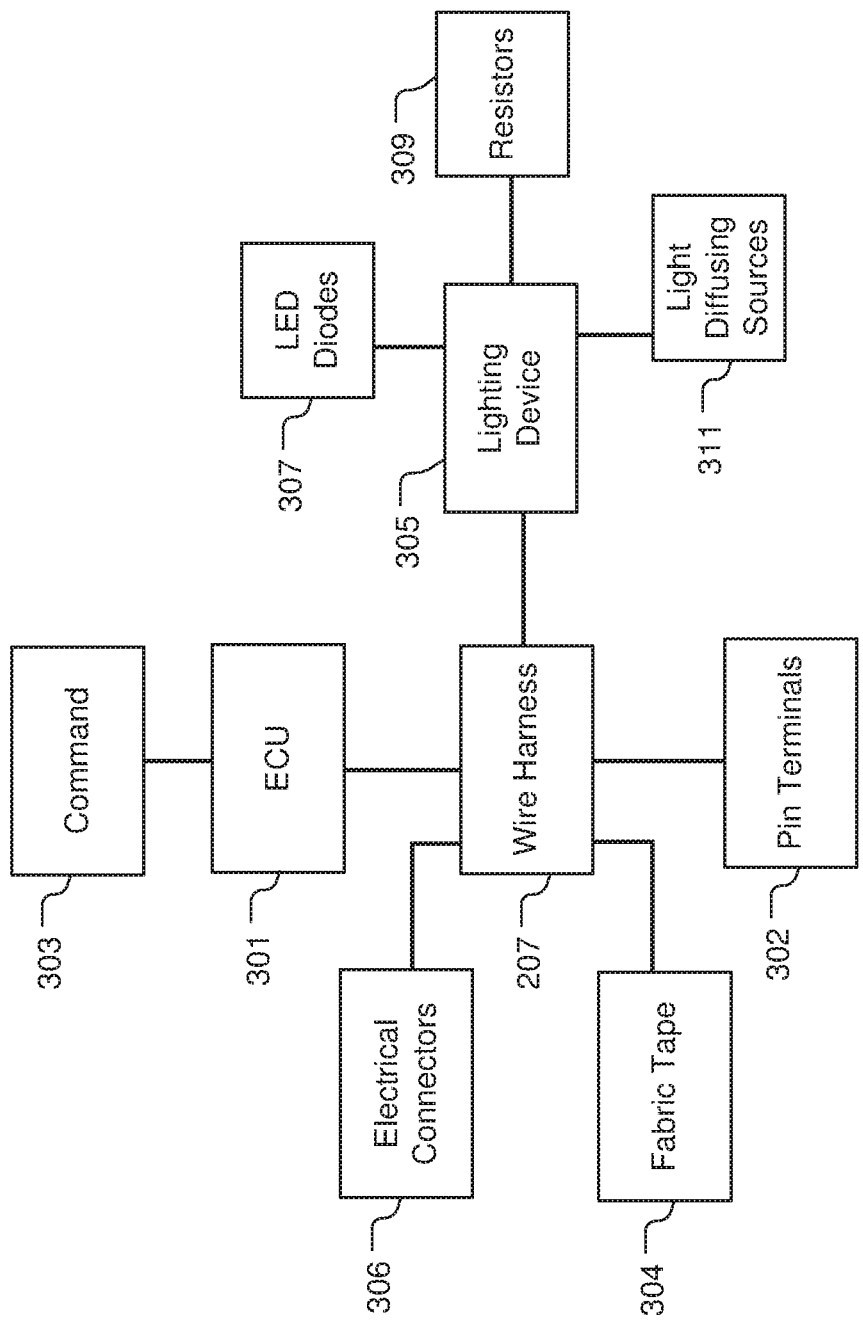
FIG. 3 is a simplified schematic of an apparatus for interior lighting of a vehicle from FIG. 2.

It should be appreciated that one of the unique features believed characteristic of the present application is apparatus 205. It should be understood that the structural components of apparatus 205 can vary as necessary to secure apparatus 205 to any make or model of a vehicle In FIG. 3, a simplified schematic of the various components contemplated for use in apparatus 205 is shown. Wire harness 207 is considered the central component configured to combine and hold the various features together. However, it should be understood that the various components could be incorporated individually, connected via wires, or connected wirelessly with the necessary components. Harness 207 can be connected to an ECU 301 in communication with a command system 303 via one or more pin terminals 302 or any other similar device providing the same functionality, fabric tape 304 or similar device, and/or electrical connectors 306. Harness 207 further includes a lighting device 305 having one or more LED diodes 307. In the preferred embodiment, the LED diodes are soldered to the wire harness along with one or more resistors 309 configured to maintain a stable functioning circuit. In addition, the LED diodes 307 can be coupled to light diffusing sources 311 such as lenses, an acrylic rod, and/or polycarbonate, thereby forming a functional assembly.

Figure 4:
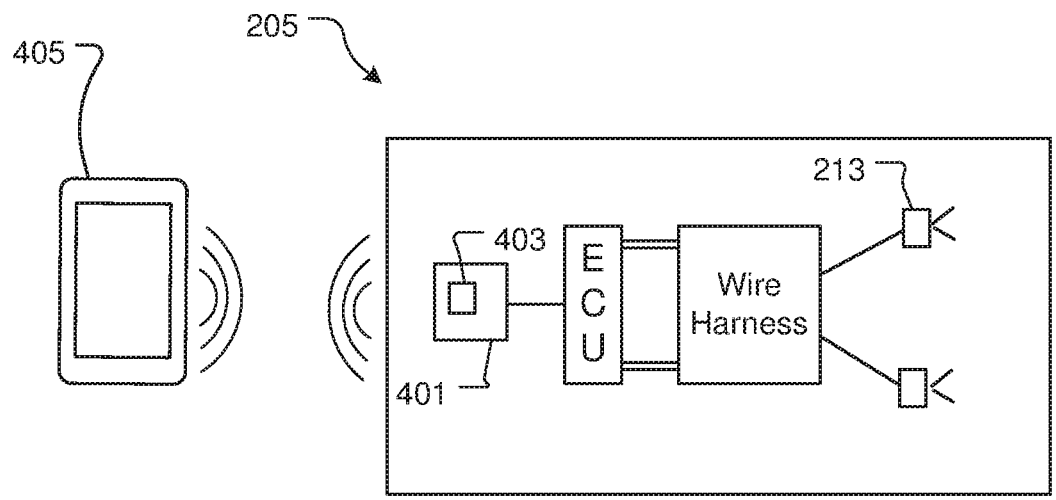
FIG. 4 is a simplified schematic of one embodiment of a command system of FIG. 3.
Figure 5:
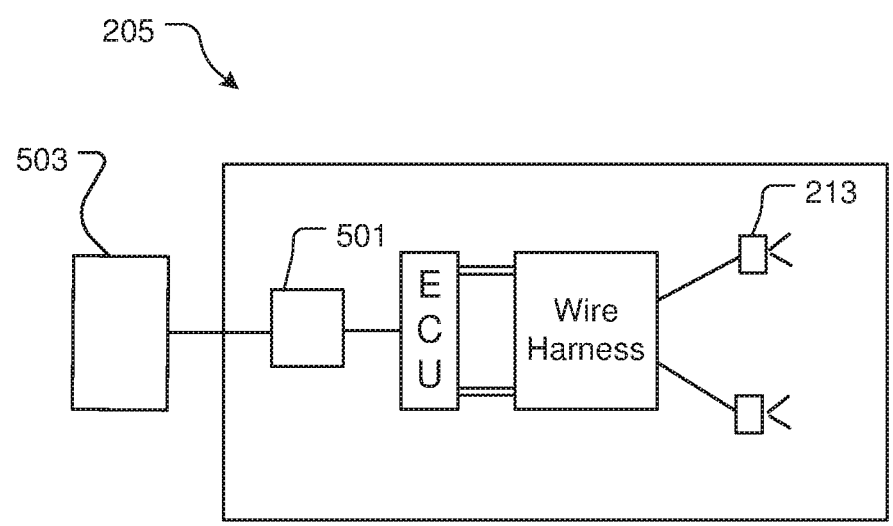
FIG. 5 is a simplified schematic of an alternative embodiment of a command system of FIG. 3.

In FIGS. 4 and 5, simplified schematics depict two contemplated command systems to be used with apparatus 205. In FIG. 4, a command system 401 includes a transceiver 403 or similar device configured to wirelessly communicate with a mobile electronic device 405 such as a smart phone. In this embodiment, the electronic device 405 I configured to receive commands from the user to control the one or more lights 213. In FIG. 5, in an alternative embodiment, a command system 501 is configured to electrically communicate with an electronic device 503 via one or more wires. In this embodiment, it is contemplated that electronic device 503 can be an interface positioned within an interior of the vehicle, thereby providing a means for the user to activate the one or more lights 213 from inside the vehicle.

Figure 6:
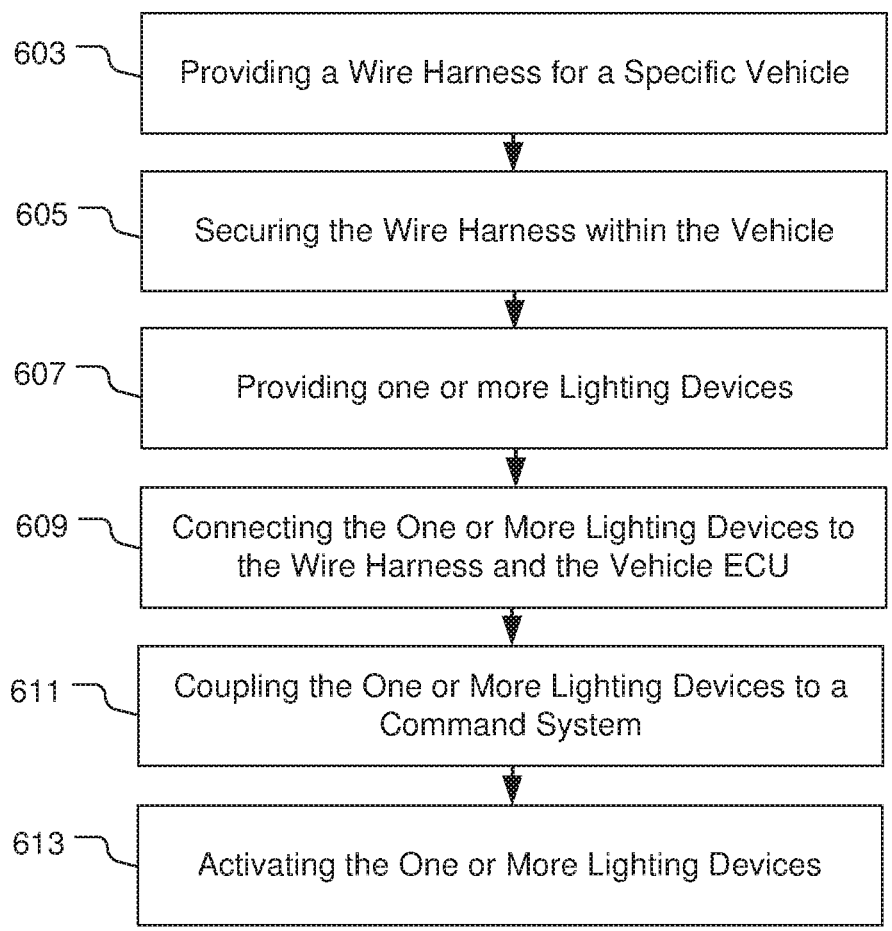
FIG. 6 is a flowchart of the method of the system of FIG. 2.

In FIG. 6, a flowchart 601 depicts a method associated with the manufacturing of system 201. During use a wire harness is provided that correlates to a specific vehicle make and model, as shown with box 603. The wire harness can be manufactured into the vehicle, or easily added aftermarket to the vehicle, as shown with box 605. One or more lighting devices is added to the wire harness, as shown with box 607. It should be appreciated and understood that the lighting devices can be manufactured directly into the wire harness, or alternatively, can be soldered in after manufacturing. The wire harness, lighting devices, and vehicle ECU are all electrically coupled together, wherein the ECU provides power to the one or more lighting devise, as shown with box 609. The lighting devices and ECU are coupled to a command system, wherein the command system controls the activation of the one or more lighting devices, as shown with boxes 611. It should be understood that the command system can be integral with the ECU, or can be one or more separate electronic devices. The one or more lights are then activated or deactivated as desired by the user through the command system, as shown with box 613.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An apparatus for interior ambient mood lighting for an interior of a vehicle, the apparatus comprising:
   a wire harness configured to conductively engage with a vehicle electrical control unit;
   one or more pin terminals integral with the wire harness and configured to engage with and obtain power from vehicle electrical control unit;
   one or more lighting devices electrically connected to the wire harness and configured to receive power from the one or more pin terminals via wire;
   a command system conductively coupled the vehicle electrical control unit and configured to control the one or more lighting devices, the command system having:
   a transceiver; and
   a mobile device in wireless communication with the transceiver, the mobile device is configured to operate the one or more lighting devices via the command system and transceiver;
   wherein the configuration of the wire harness and the one or more pin terminals is vehicle specific, thereby being configured to engage with a specific vehicle make and model.

2. The apparatus of claim 1, wherein the one or more lighting devices comprises:
   one or more LED diodes; and
   one or more resistors coupled to the one or more LED diodes.

3. The apparatus of claim 1, wherein the one or more lighting devices is configured to provide a colored light.

4. The apparatus of claim 1, wherein the command system includes an interface electrically coupled to the one or more lighting devices and accessible from an interior of the specific vehicle, the interface configured to receive commands from a user.

5. A method of providing ambient light to an interior area of a vehicle, the method comprising:
   providing the system of claim 1;
   securing the wire harness within the vehicle;
   activating the one or more lighting devices via a command system coupled to the one or more light sources.

6. The method of claim 5, wherein the command system is an interface electrically coupled to the one or more lighting devices and accessible from an interior of the vehicle, the interface configured to receive commands from a user.

7. The method of claim 5, wherein the one or more lighting devices include LED lights.

8. The method of claim 5, wherein the one or more lighting devices include colored LED lights.

* * * * *